United States Patent [19]
Blank

[11] Patent Number: 5,807,043
[45] Date of Patent: Sep. 15, 1998

[54] INTERLOCKING MACHINE TOOL WAY COVER

[75] Inventor: Clay Blank, Machesney Park, Ill.

[73] Assignee: Hennig, Inc., Rockford, Ill.

[21] Appl. No.: 915,046

[22] Filed: Aug. 20, 1997

[51] Int. Cl.$^6$ .......................... B23Q 11/08; E05D 15/06
[52] U.S. Cl. .................................. 409/134; 29/DIG. 56; 29/DIG. 94; 74/608; 160/202; 160/223
[58] Field of Search .................. 409/134, 137; 29/DIG. 94, DIG. 56; 160/202, 223, 224; 74/608

[56] References Cited

U.S. PATENT DOCUMENTS

| | | | |
|---|---|---|---|
| 3,426,830 | 2/1969 | Hascher et al. | 160/202 X |
| 3,429,356 | 2/1969 | Loos et al. | 160/223 |
| 3,565,153 | 2/1971 | Loos et al. | 160/202 |
| 4,039,021 | 8/1977 | Moritz et al. | 74/608 X |
| 5,570,979 | 11/1996 | Okamoto et al. | 409/134 |

FOREIGN PATENT DOCUMENTS

| | | | |
|---|---|---|---|
| 3205624 | 8/1983 | Germany | 160/202 |
| 3206461 | 9/1983 | Germany | 160/202 |

*Primary Examiner*—William R. Briggs
*Attorney, Agent, or Firm*—Leydig, Voit & Mayer, Ltd.

[57] ABSTRACT

A machine tool way cover to provide protection to a moveable machine tool which is provided with an interlocking feature to prevent misalignment or skewing of the actual way cover. The present invention provides a dramatic improvement over prior art machine tool coverings and way covers in that it eliminates the need for individual segments of the machine tool way cover to be manufactured to extremely tight physical tolerances by providing interlocking channels at the base of each way cover segment. The channels provide grooves within which the channels of smaller segments actually move as the machine tool and machine tool way cover move in and out. By providing such an interlocking mechanism, the machine tool way cover avoids becoming misaligned and inoperative even when objects or personnel impart substantial loads to the way cover. Moreover, by providing each segment with a pair of horizontally disposed channels, the need to provide a sealant between the back panel and each segment is eliminated in that the channels serve as a conduit to direct any liquid matter which falls on the way cover away from the actual machine tool.

16 Claims, 3 Drawing Sheets

INTERLOCKING MACHINE TOOL WAY COVER

FIELD OF THE INVENTION

The present invention generally relates to mechanisms for protecting moveable machine tools from debris and contaminants, and more particularly relates to machine tool way covers.

BACKGROUND OF THE INVENTION

Modern machine tools are often adapted to move in various directions as they perform machining operations on a given work piece. The machines can be adapted to move by a variety of transmissions, including a wheeled platform which rides upon rails and which is powered by electrical or hydraulic primary movers, and timing screws which move the platform on which the machine tool is disposed back and forth as the threads of the screw axially translate relative to a frame of the machine tool.

As the machine tool moves back and forth, side to side, or up and down, the machining operation performed by the machine tool will generate debris and contaminants. In addition, coolant from the machine tool will often be expelled from the machine tool as well. Given the tolerances under which the machine tools are programmed to operate, the contaminants, debris, and coolant can often detrimentally disrupt these tolerances if they come into contact with the transmission means or way platform of the machine tool. In addition, electrical or hydraulic cables often extend from the machine tool to a power source and can also be detrimentally affected by falling debris. It is therefore advantageous to provide some way of protecting the way platform over which the machine tool moves to protect the way platform from such debris, contaminants and coolant.

A variety of mechanisms have therefore been developed to provide for such protection. These mechanisms include steel way covers which are formed in the shape of telescoping sections which expand and contract with the machine tool as the machine tool moves over the way platform. The way covers can be shaped in a variety of configurations including, but not limited to, rectangular boxes, and cylindrical tubes. As the machine tool moves back and forth over the way platform, the individual boxes or tubes expand or contract to provide a covering for the way platform.

While such way covers have proven to be effective in providing protection for the way platform, problems often arise when the way cover, or segments of the way cover become skewed due to poor ratios and therefore interfere with proper telescoping retraction and extension of the way cover. With prior art way covers, the individual segments of the way cover are held together through friction and by manufacturing the way covers to extremely tight tolerances which allow for the segments to move in and out with very little lateral movement there between. However, when something or someone comes in contact with the way covers, these tolerances can be detrimentally affected and individual segments of the way cover can in fact become disengaged. For example, if someone were to step on top of a typical prior art way cover, the sides of the individual segments might be forced outside of the adjoining segments, or be skewed to a sufficient degree to interfere with proper telescoping operation.

In addition to the down time and damage that can result from the way cover becoming skewed, the process of manufacturing and assembling the way covers in the first place is made relatively expensive through the demand of such tight tolerances. Moreover, when the individual segments become skewed and/or damaged or otherwise out of alignment, the operator of the machine tool is often physically incapable of realigning or rejoining the segments of the way cover due to the relatively thick gauge material from which the way covers are manufactured.

SUMMARY OF THE INVENTION

It is therefore a primary aim of the present invention to provide a machine tool way cover which is able to maintain proper alignment of the individual segments of the way cover.

It is an objective of the present invention to provide a machine tool way cover which is able to resist becoming skewed or out of alignment when objects or personnel physically engage and impart force to the way cover.

It is yet another objective of the present invention to provide a machine tool way cover which avoids becoming misaligned while at the same time is provided with means for trapping or otherwise separating liquid matter from coming into contact with the machine tool which the way cover is designed to protect.

In accordance with these aims and objectives it is a feature of the present invention to provide an interlocking way cover comprising a plurality of telescopingly connected enclosures wherein each enclosure comprises a shroud, a wiper, and a back panel. The shroud includes a front, back, top, two sides, and a pair of channels provided at inside bottoms of the two sides. The channels run parallel to each other and run from the front to the back of each enclosure. The front of each enclosure is open and the plurality of enclosures are dimensioned to telescopingly align with the channels of enclosures both fore and aft and ride within the channels of the adjoining enclosures to prevent lateral movement of the enclosures. The wipers are attached to an inside surface of the shroud top adjacent to the shroud front and are adapted to engage the top of a smaller enclosure to wipe debris therefrom. The back panels are attached to the back of the shroud and are dimensioned so as to engage the wiper provided on an adjacent shroud to thereby limit forward movement of the enclosure. It is another feature of the present invention to form each shroud, including the channels, from a single piece of sheet metal which is drawn into a C-shaped section.

It is yet another feature of the present invention to provide the C-shaped channels to provide a trough into which liquid matter can be collected and directed away from the machine tool way surface.

It is yet another feature of the present invention to provide an interlocking way cover provided with a plurality of plastic guide members having a relatively low coefficient of friction which can ride upon the way surface of the machine tool as the machine tool way cover moves back and forth.

It is still a further feature of the present invention to provide the wiper in the form of an elastomeric member releaseably held by a metal bracket welded to the inside surface of the shroud top.

These and other aims, objectives, and features of the present invention will become more apparent from the following detailed description when taken in conjunction with the accompanying drawings.

Figure 1:
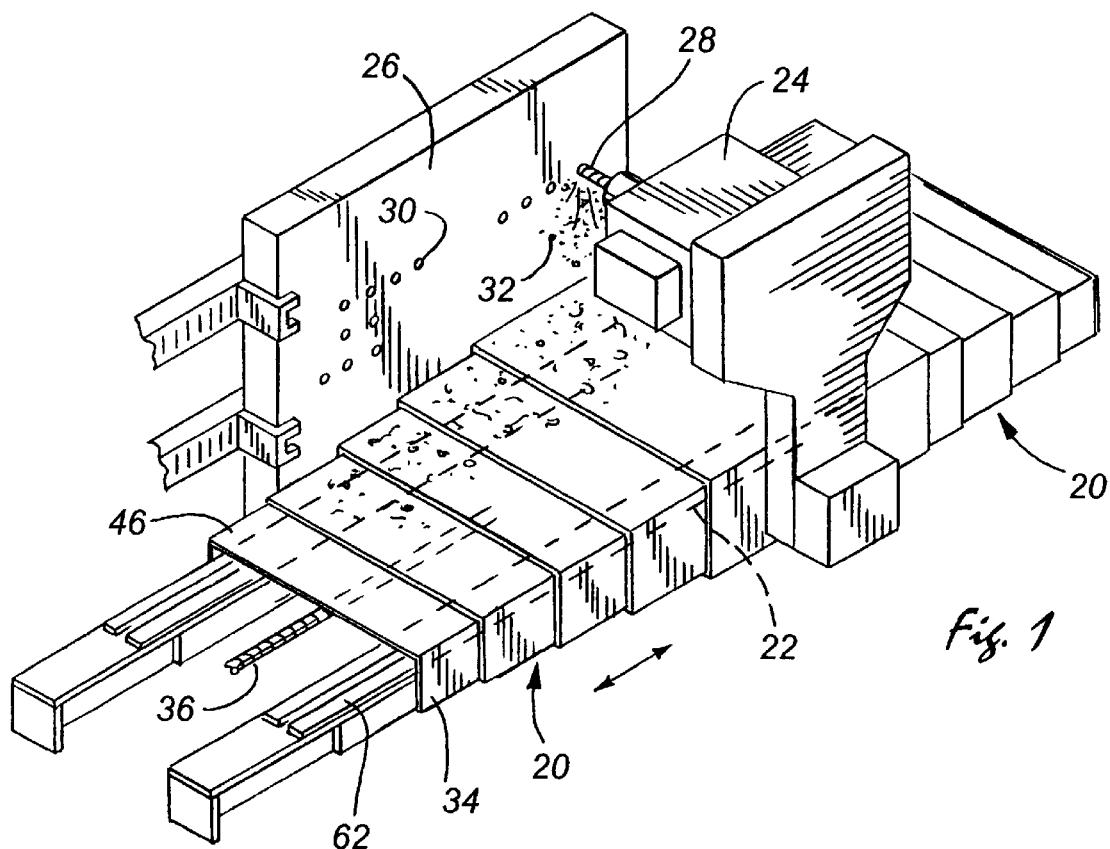
FIG. 1 is a perspective view of one embodiment of the present invention shown mounted to an actual machine tool.

While the present invention is susceptible of various modifications and alternative constructions, certain illustrative embodiments thereof have been shown in the drawings and will be described below in detail. It should be understood, however, that there is no intention to limit the present invention to these specific forms disclosed, but on the contrary, the intention is to cover all modifications, alternative construction, and equivalents falling within the spirit and scope of the present invention as defined by the appended claims.

DETAILED DESCRIPTION OF THE PREFERRED EMBODIMENT

Referring now to the drawings and with specific reference to FIG. 1, the preferred embodiment of the present invention is shown as way cover 20. As is conventional, way cover 20 is designed to telescopingly expand and retract across the way platform 22 of machine tool 24. By way of example only, a work piece 26 is shown adjacent machine tool 24. It can be seen that as machine tool 24 moves back and forth along way platform 22, tool 28 of machine tool 24 can machine holes 30 into work piece 26. It is to be understood that way cover 20 can be used with a variety of machine tools and tool 28 is only depicted as an example. As this machining operation is performed, debris 32, which includes fragments of material removed by tool 28, is generated which would tend to fall onto way platform 22 if not for way cover 20. However, by providing way cover 20, debris 32, which can also include coolant and other liquid matter generated by machine tool 24, falls on top of the individual segments 34 of way cover 20 and are directed safely away from way platform 22.

The problems which can be caused by debris and other contaminants coming into contact with way platform 22 depend on the actual nature of the transmission means provided for machine tool 24. The example shown in FIG. 1 is that of a conventional screw conveyor 36 which rotates to allow the machine tool 24 to move back and forth. The way surface on which machine tool 24 rests therefore axially translates along screw conveyor 36 as it rotates. If the fragments removed from work piece 26 were to come in contact with screw conveyor 36, they could obviously cause abrasion to the screw conveyor or could damage the threads within machine tool 24 through which screw conveyor 36 passes. Similarly, if the coolant or other liquid matter falling on way cover 20 were to come in contact with screw conveyor 36, it could potentially cause rust, or otherwise detrimentally affect the performance of screw conveyor 36.

It is also important to understand that additional way covers 20 could be provided on additional sides of machine tool 24 to protect in additional directions beyond the horizontal direction depicted in FIG. 1.

As way cover 20 expands and contracts, the telescoping segments 34 normally move correctly in repetition with little, if any, lateral movement therebetween. However, if sufficient force is imparted to the individual segments 34 of way cover 20, these segments can be caused to move out of alignment and can in fact separate from adjoining segments. For example, if an operator were to step on top of way cover 20, the segment which receives such force can be physically separated from the remaining segments of way cover 20. Similarly, if a machine or physical object were to hit way cover 20, and sufficient lateral spacing were provided between the individual segments of way cover 20, way cover 20 might be moved out of correct alignment which would detrimentally affect telescopic retraction and extension of way cover 20.

Figure 2:
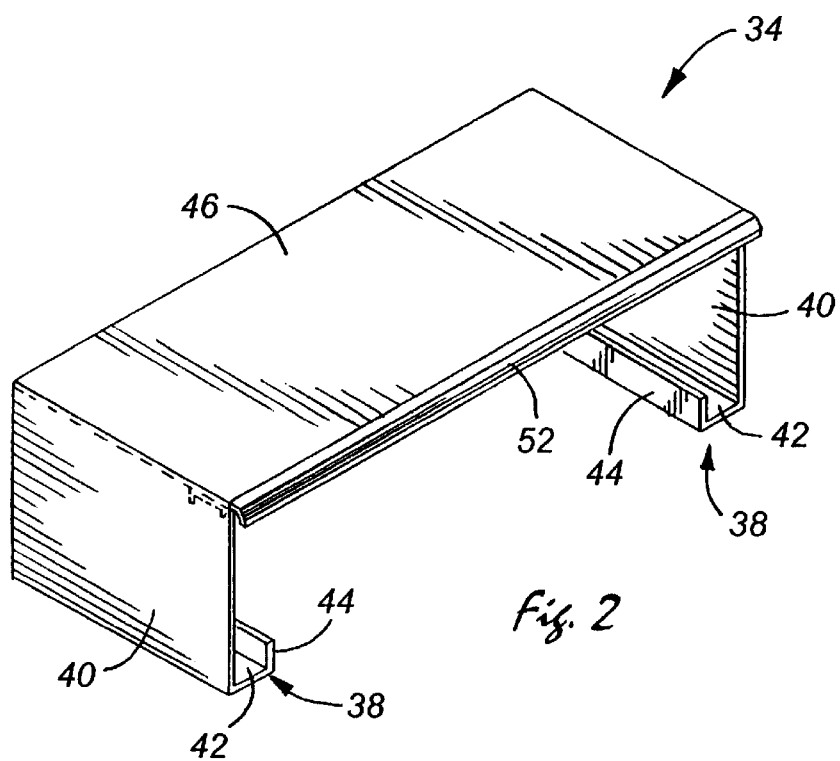
FIG. 2 is a perspective view of one segment of the machine tool way cover shown in FIG. 1.
Figure 3:
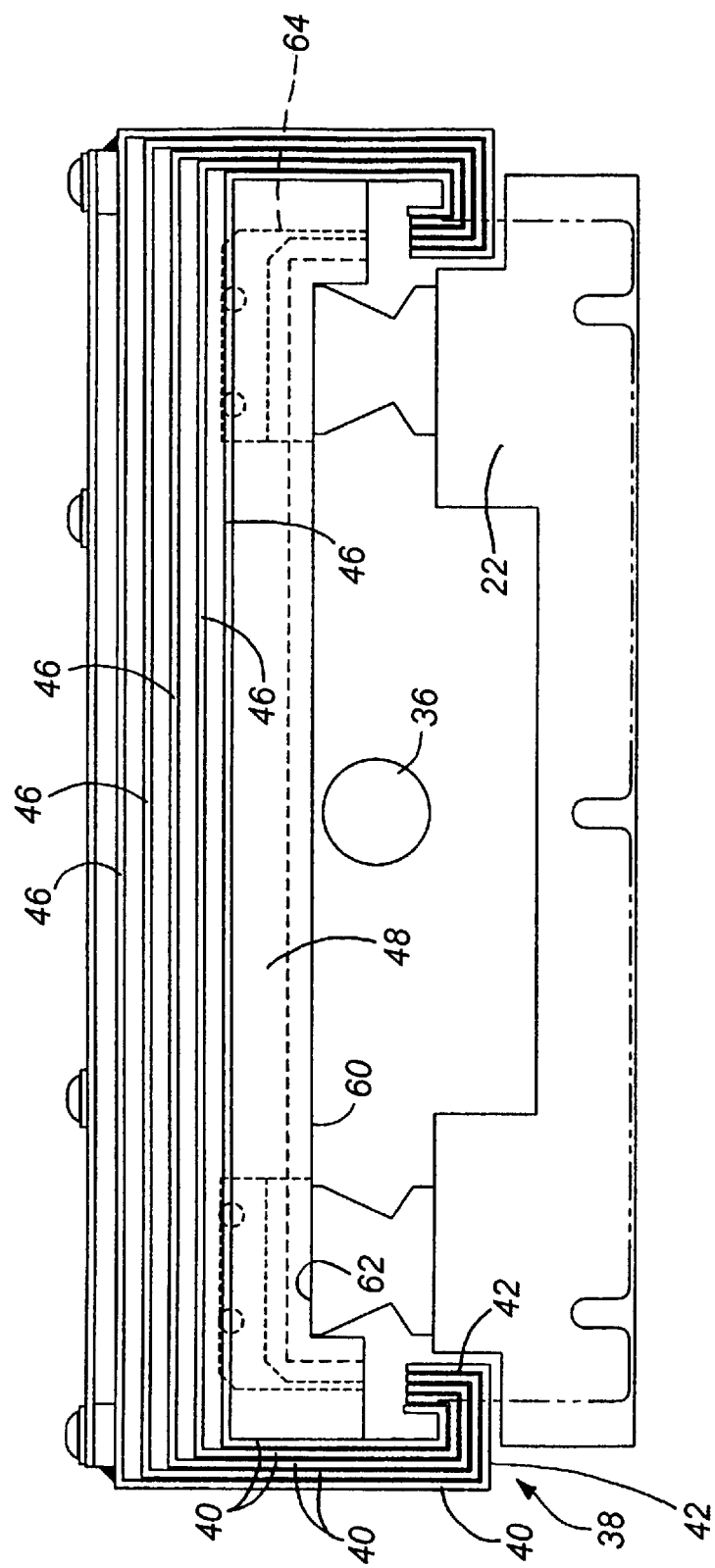
FIG. 3 is an end view of one embodiment of the present invention shown in the retracted position with the interlocking channels being depicted.
Figure 4:
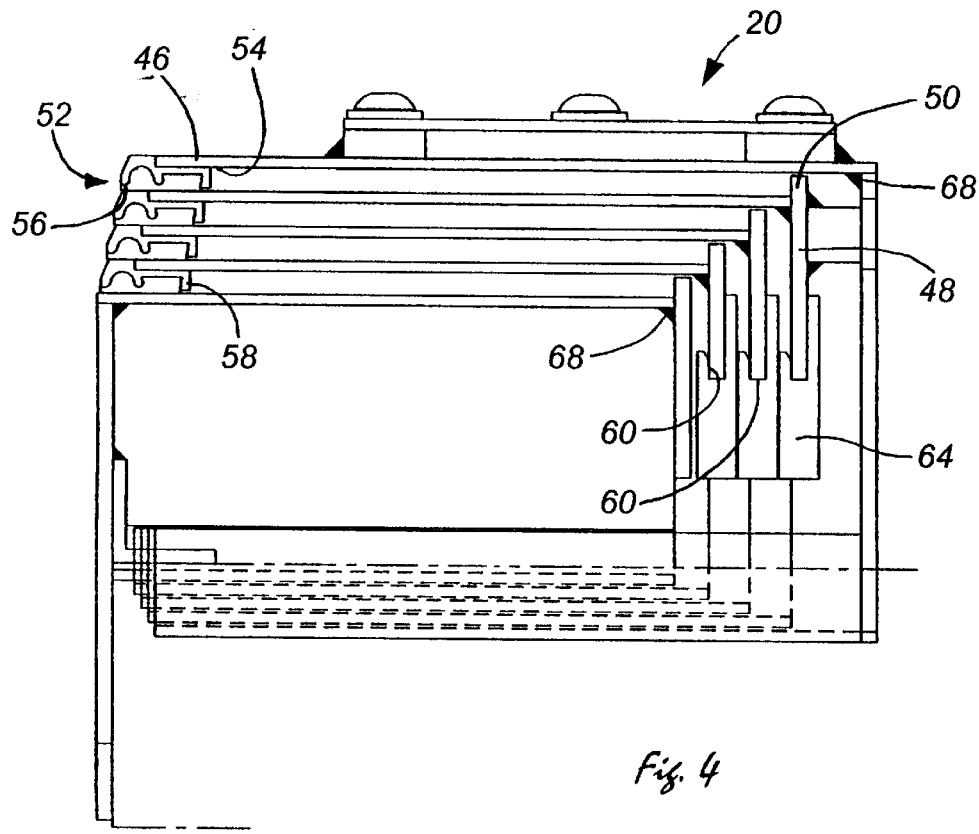
FIG. 4 is a side view of one embodiment of the present invention showing the way cover in the retracted position and showing the low coefficient of friction guide members clipped to the back panels of each segment.

It is to this area that the present invention is most specifically directed, and upon which the present invention most specifically improves. As shown in FIGS. 2–4, each segment 34 of way cover 20 is provided with interlocking channels 38. Interlocking channels 38 are formed by continuing sides 40 into a U-shaped groove including bottom 42 and upright lip 44. In actual practice, each segment 34 is formed from a single piece of sheet metal which is drawn into the depicted shape including top 46. However, it is to be understood that the present invention is not only directed to way covers wherein each segment is formed from a single piece of sheet metal, but is also directed to embodiments wherein interlocking channels 38 are manufactured separately from each segment 34.

Figure 5:
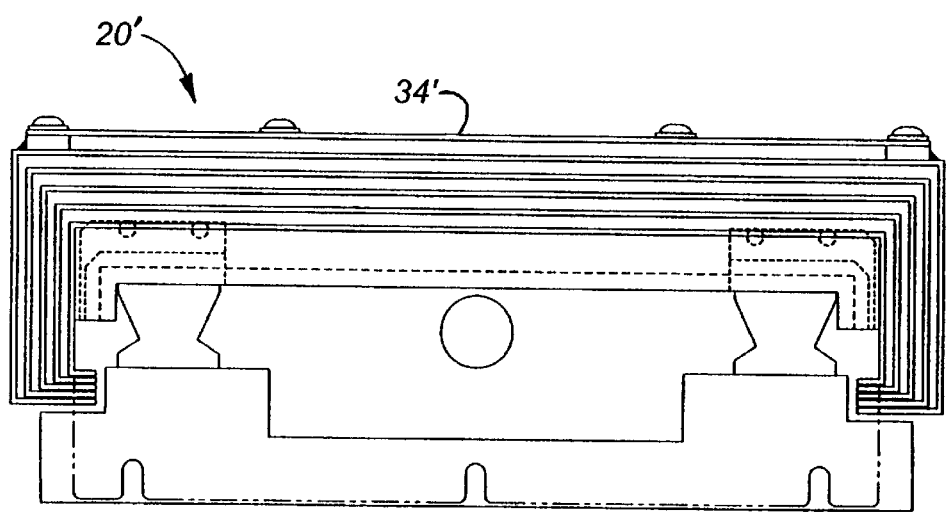
FIG. 5 is an end view of a prior art machine tool way cover.

One inventive feature of interlocking channel 34 is most clearly shown in a comparison between FIG. 3 and FIG. 5. FIG. 5 depicts a prior art way cover 20' which of course does not include interlocking channel 38. Rather, each segment 34' of the prior art device is allowed to telescopingly retract and extend with no mechanism provided to prevent lateral movement or skewing of the individual segments other than the physical tolerances to which the individual segments 34 are manufactured. As a result, the prior art device shown in FIG. 5 can easily become skewed, or otherwise out of alignment, or physically separated if sufficient force is imparted thereto. However, with the present invention as shown in FIG. 3, each segment 34 includes interlocking channel 38 which prevents such skewing and separation. Specifically, lips 44, physically contain segments 34 in a tight telescopic orientation.

Turning now to FIG. 4, it can be seen that individual segments 34 are manufactured in descending size in order to provide the telescopic effect. Furthermore, as shown with reference to FIG. 3, the interlocking channels 38 provide a mechanism by which lateral movement is kept to a minimum. FIG. 4 is provided to show that individual segments 34 are provided with physical limits as to the forward and rearward movement of each segment. As is conventional, each segment 34 is physically attached to a back panel 48 which is joined thereto with top edge 50 of back panel 48 being provided above top 46 of each segment 34. Furthermore, each segment 34 is provided with a wiper 52 at the interior front edge 54 of each segment. Therefore, as the segments 34 telescopingly extend, the top edge 50 of each back panel rides along the interior surface of the next larger segment until engaging wiper 52 and thereby being prevented from further axial extension. As is conventional, wiper 52 includes an elastomeric member 56 which is physically held in place by metal bracket 58 welded to the interior surface of each segment 34.

As shown in FIGS. 3 and 4, each back panel 48 includes a bottom edge 60 which is designed to ride along the actual way surface 62 of machine tool 24. The way surface 62 is normally manufactured from a flat, polished metal, while back panel 48 is normally manufactured from a relatively course metal. With certain prior art devices, no intermediate means is provided to reduce the friction therebetween, while with other devices, brass fittings are provided to reduce friction. In either situation, significant force will be necessary to physically expand and retract way cover 20 across way surface 62. With the present invention, on the other hand, a synthetic plastic guide 64 is provided on bottom edge 60 to reduce friction with way surface 62. By providing guide 64 with a low coefficient of friction, way cover 20 can more easily expand and retract, and thereby require less power for such movement.

Another patentable feature of the present invention, as referred to earlier, is that interlocking channels 38 also serve as a collection channel or reservoir to prevent liquid matter from coming into contact with way platform 22 or other internal machine components. With prior art devices, an epoxy resin, silicone, or other type of sealant would be provided between back panel 48 and segment 34 to prevent passage of such liquid matter. The present invention also provides such an epoxy resin or silicone layer as depicted by element 68 in the figures. However, in order to provide added protection against such liquid intrusion, interlocking channels 38 serve as collection reservoirs to prevent any liquid matter that does pass through sealant 68 from reaching way surface 62 or sensitive machine components. Ordinarily, the liquid passing there through will be of such a small volume that it can simply reside within the interlocking channels 38 without an actual collection port being needed. The liquid matter can then either harden or evaporate harmlessly.

From the foregoing, it can be appreciated that the present invention provides a new and improved machine tool way cover which dramatically reduces the risk of the machine tool way cover becoming skewed or out of telescopic alignment. By providing interlocking channels along the bases of each way cover segment, the segments can be telescopically joined and prevented from lateral movement between respective segments through the engagement of the lips provided with each interlocking channel. Moreover, by providing the interlocking mechanism in the form of mating channels, any liquid matter which does manage to pass through the way cover is then provided with a secondary means of protection in that the channels serve as liquid reservoirs to prevent the liquid matter from actually coming into contact with the way surface and internal machine components or other vulnerable moving parts of the machine tool.

What is claimed is:

1. An interlocking way cover comprising a plurality of telescopingly connected enclosures, each enclosure comprising:
   a shroud having a front, back, top, two sides, and a pair of channels provided at inside bottoms of the two sides, the channels running parallel to each other and running from the front to the back of each enclosure, the front of each enclosure being open, the plurality of enclosures being dimensioned to telescopingly align, the channels of each enclosure engaging and running within the channels of adjoining enclosures to prevent lateral movement of the enclosures;
   a wiper attached to an inside surface of the shroud top adjacent the front of the shroud, the wiper adapted to engage the top of a smaller enclosure to wipe debris therefrom; and
   a back panel attached to the back of the shroud and being dimensioned so as to engage the wiper provided on an adjacent shroud to thereby limit further forward movement of the enclosure.

2. The interlocking way cover of claim 1 wherein each shroud is formed from a single piece of sheet metal drawn into a C-shaped member.

3. The interlocking way cover of claim 1 wherein the wiper is an elastomeric member releaseably held by a metal bracket welded to the shroud top.

4. The interlocking way cover of claim 1 wherein each back panel includes a bottom edge designed to ride along a way surface of a machine tool and a plurality of guides having a low coefficient of friction clipped to the bottom edge to minimize frictional losses as the way cover moves back and forth over the way surface.

5. The interlocking way cover of claim 4 wherein the guides include an interior groove dimensioned to receive the back panel therein and be frictionally held thereto.

6. The interlocking way cover of claim 1 wherein a sealant is provided between the back panel and the shroud to prevent fluid matter from passing therebetween.

7. The interlocking way cover of claim 1 wherein the back panels are welded to the shrouds.

8. An interlocking mechanism for machine tool way covers of the type having a plurality of telescopingly connected segments, each segment having a top and two sides, the top and two sides having inside surfaces, the interlocking mechanism including channels provided on the inside surfaces of each side, each channel having a bottom and an adjoining lip directed perpendicular to the top, the bottoms of smaller interlocking mechanisms riding above the bottoms of larger interlocking mechanisms as the way cover moves back and forth, the lips of smaller interlocking mechanisms engaging the lips of larger interlocking mechanisms to prevent lateral movement of the segments as the way cover moves back and forth.

9. The interlocking mechanism of claim 8 wherein each segment is formed from a single piece of sheet metal drawn into a C-shaped member.

10. The interlocking mechanism of claim 8 wherein a wiper is attached to an inside surface of the shroud top adjacent the shroud front, the wiper being adapted to engage the top of a smaller enclosure to wipe debris therefrom.

11. The interlocking mechanism of claim 10 wherein the wiper is an elastomeric member releaseably held by a metal bracket welded to the inside surface of the shroud top.

12. The interlocking mechanism of claim 8 further including a back panel attached to the back of the shroud and being dimensioned so as to engage the wiper provided on an adjacent shroud to thereby limit further forward movement of the enclosure.

13. The interlocking mechanism of claim 12 wherein each back panel includes a bottom edge designed to ride along a way surface of a machine tool and a plurality of guides having low coefficients of friction are clipped to each bottom edge to minimize frictional losses as the way cover moves back and forth over the way surface.

14. The interlocking mechanism of claim 13 wherein the guides include an interior groove dimensioned to receive back panels therein and be frictionally held thereto.

15. The interlocking mechanism of claim 13 wherein a sealant is provided between the back panel and the segment to prevent fluid matter from passing therebetween.

16. The interlocking mechanism of claim 13 wherein the back panels are welded to the segments.

* * * * *